(12) United States Patent
Jalili (10) Patent No.: US 9,186,587 B2
(45) Date of Patent: Nov. 17, 2015

(54) DISTRIBUTION OF ELECTRONIC GAME ELEMENTS

(71) Applicant: Reza Jalili, Sandy, UT (US)

(72) Inventor: Reza Jalili, Sandy, UT (US)

( * ) Notice: Subject to any disclaimer, the term of this patent is extended or adjusted under 35 U.S.C. 154(b) by 492 days.

(21) Appl. No.: 13/645,417

(22) Filed: Oct. 4, 2012

(65) Prior Publication Data

US 2014/0100028 A1    Apr. 10, 2014

(51) Int. Cl.
*A63F 13/00* (2014.01)
*G06Q 30/02* (2012.01)
*A63F 13/73* (2014.01)
*A63F 13/79* (2014.01)
*A63F 13/61* (2014.01)

(52) U.S. Cl.
CPC .............. *A63F 13/73* (2014.09); *A63F 13/61* (2014.09); *A63F 13/79* (2014.09); *G06Q 30/02* (2013.01)

(58) Field of Classification Search
CPC ............ A63F 2300/5526; A63F 2300/57; A63F 2300/5546; A63F 2300/513; A63F 2300/5506; A63F 13/61; A63F 13/79; A63F 13/73; G06Q 30/02; G06Q 30/0271; G06Q 30/0251; H04N 21/23424; H04N 21/458; H04N 21/4316

USPC ........................................................... 463/31
See application file for complete search history.

(56) References Cited

U.S. PATENT DOCUMENTS

| | | | | |
|---|---|---|---|---|
| 5,937,390 | A * | 8/1999 | Hyodo ..................... | 705/14.61 |
| 6,036,601 | A * | 3/2000 | Heckel ..................... | 463/42 |
| 6,196,920 | B1 * | 3/2001 | Spaur et al. .............. | 463/42 |
| 6,379,251 | B1 * | 4/2002 | Auxier et al. ............. | 463/42 |
| 6,625,578 | B2 * | 9/2003 | Spaur et al. .............. | 705/14.5 |
| 6,790,142 | B2 * | 9/2004 | Okada et al. ............. | 463/42 |
| 7,698,178 | B2 * | 4/2010 | Chu .......................... | 705/28 |
| 7,901,288 | B2 * | 3/2011 | Barsness et al. ......... | 463/30 |
| 8,128,493 | B2 * | 3/2012 | Willis et al. ............. | 463/31 |
| 8,752,087 | B2 * | 6/2014 | Begeja et al. ............ | 725/34 |
| 8,904,430 | B2 * | 12/2014 | Zalewski ................. | 725/36 |
| 2004/0248649 | A1 * | 12/2004 | Arai et al. ................ | 463/32 |
| 2005/0277473 | A1 * | 12/2005 | Barry ....................... | 463/42 |
| 2009/0227378 | A1 * | 9/2009 | Rom et al. ............... | 463/42 |
| 2010/0122286 | A1 * | 5/2010 | Begeja et al. ............ | 725/34 |
| 2010/0323799 | A1 * | 12/2010 | Lee et al. ................. | 463/42 |

* cited by examiner

*Primary Examiner* — David L Lewis
*Assistant Examiner* — Matthew D. Hoel (57) ABSTRACT

A system, method, and computer-readable storage medium for using electronic advertising resources as mechanisms to enable individuals to participate in electronic games alone or in conjunction with other players.

18 Claims, 2 Drawing Sheets

DISTRIBUTION OF ELECTRONIC GAME ELEMENTS

CLAIM OF PRIORITY

This application is a continuation-in-part of U.S. patent application Ser. No. 12/764,906, filed Apr. 21, 2010, which claims the benefit of U.S. provisional application No. 61/172,222, filed Apr. 24, 2009 and provisional application No. 61/257,837, filed Nov. 3, 2009; this application also claims the benefit of U.S. provisional patent application No. 61/543,314, filed Oct. 5, 2011. Each of these applications is incorporated by reference herein, in their entireties, for all purposes.

FIELD

The present invention generally pertains to distributing electronic game elements throughout an electronic network, such as the Internet.

BACKGROUND

Videos games are a popular form of entertainment and players of all ages are intrigued and entertained by the challenges they present. There are various kinds of video game systems, often referred to as "platforms." Videos games may be played upon a specific video game device, referred to as a "game console," that is connected to a television or other monitor to enable game play. The Microsoft Xbox 360, the Sony PlayStation 3, and the Nintendo Wii are popular game consoles. Additionally, portable video game systems, such as the Nintendo DS and the Sony PSP, enable mobile play. These small, all-in-one devices allow an individuals to play wherever they choose. Video games may also be played on more general purpose devices, such as personal computers, including desktop computers, laptop computers, tablet computers, etc. A video game may be software installed onto the personal computer (i.e., either from a disk or from a downloaded file) or may be played via a web browser accessing the Internet. For example, a user may play a game installed on his computer, play one on a game Web site, such as PopCap.com, or play a game offered through a social networking site, such as Farmville on Facebook. Additionally, videos games may be played on mobile devices, such as cell phones and smartphones. Such games may be played via a the mobile device's web browser or, more typically, via a mobile software application (i.e., an "app"). As a mobile devices have become ubiquitous, mobile app games reach a broad audience of players and are some of the most popular video games (e.g., Angry Birds by Rovio Entertainment).

All of the aforementioned video game systems involve the user setting aside time to play. An individual must either activate the game on his game console or other device or must access a particular Web site (perhaps needing to login as well). None of these systems allow a user to play an electronic game as a quick interruption to another task. For example, although a person may view an electronic ad for a video game as he browses the Internet, he must stop his current browsing to play the video game if he so desires. Although this may be tempting, the user may not wish to be overly diverted from the task at hand.

Advertising on the Internet involves placing an electronic advertisement, herein referred to as an "electronic ad," on a Web page or along with other digital content in the hope that a consumer will see it. Advertising on the Internet involves an enormous market that has been growing steadily since 1995. Massive sums of money have been spent on advertising on the Internet, including tracking the performance of electronic ads and targeting advertisements to particular audiences using technologies referred to as "targeting technologies." Yet of all electronic ads distributed on Web sites, only a very small fraction is clicked. Ad space providers and advertisers have perpetually grappled with the problem of low response rates.

An electronic ad includes electronic advertising content and this content is distinct from other forms of electronic content distributed via the Internet. Electronic advertising content is created by a commercial entity in order to drive usage and/or sales of a good or service, herein collectively referred to as "product." It is not merely content associated with a product, but rather is distributed specifically to generate a benefit (typically a monetary one) for the producer or supplier of the product. For example, an independent review of a product is not electronic advertising content, whereas advertising text distributed by the product manufacturer is electronic advertising content. Additionally, electronic advertising content is subject to advertising laws and regulations, such as truth-in-advertising laws.

An electronic ad may be created so that its distribution may be tracked and evaluated. For example, an electronic ad may include computer code that enables an advertiser to ascertain how many times it has been viewed (e.g., how many "impressions" or "clicks"). Electronic ad tracking may be conducted for financial purposes. For example, an ad provider may charge for ad distribution on a per viewing basis. An advertiser may be responsible for paying the ad provider each time the ad is viewed or fee for a particular amount of viewings.

Generally, electronic advertising works in the following way: a Web site publisher designates space on its Web site as available for advertising. An ad provider provides the publisher with a computer code to be implanted in this ad space. An ad provider is an entity that distributes electronic ads via a network (e.g., the Internet) on behalf of an advertiser, usually for a fee, such as Google AdSense, Yahoo, etc. An advertiser is an entity wishing to promote a good, service, etc. When an individual visits a particular page of that publisher's Web site via his web browser, the page is generated per the publisher's source code, while the electronic ad is generated in the ad space per the ad provider's code. The electronic advertising content is retrieved from the ad provider's ad server system and fills the ad space on the Web page. The ad server system maintains electronic advertising content, typically configured by the ad provider on behalf of an advertiser. Each time a visitor visits a Web page, a new set of electronic ads may be displayed because the site publisher may have business relationships with more than one ad provider or because the same ad provider may choose a different set of electronic ads to show on the Web page. Furthermore, the electronic ad code itself may specify various ads to be shown in the ad space and the ad displayed may vary per the user's particular visit to the Web page. A user may select an electronic ad, such as by clicking it, and his web browser typically is directed to present a landing page associated with the advertiser. The landing page is typically the advertiser's main Web page. For example, a user selecting an electronic ad for a dating service will be presented with the dating service's home page. When a user clicks on an electronic ad, his attention to his previous task is interrupted. With the browser navigating to the ad's landing page, the user's attention is diverted.

Because selecting electronic ads interrupts the user's current activity, users tend to ignore them. Advertisers try to counteract this tendency by employing various targeting methods. An advertiser may place electronic ads on Web pages that are related to the product advertised. More sophisticated electronic advertising methods, such as Google AdSense, involve embedding a code that may interpret the content of the Web page and retrieve associated electronic advertising content from the ad server system. For example, if the Web page content includes gaming-related terms (e.g., "game," "player," etc.), the code may cause the presentation of an electronic ad for a video game system. Even though the electronic ad displayed may be relevant to a user's interests, the user is still required to stop what he is currently doing to interact with it. The fact that the electronic ad is related to his interests may not be sufficient enticement for him to do so.

Because most users ignore electronic ads, a tremendous amount of assets, such as bandwidth, screen space (e.g., Web page "real estate"), are, in effect, wasted. Significant electronic and human resources are involved in the distribution and tracking of electronic ads, but for marginal gain.

What is needed is a mechanism to employ the resources of an electronic network, such as the Internet, in a more effective manner. In particular, what is needed is system and method for using resources generally employed for electronic advertising as a convenient and effective medium by which to enable electronic game play. Furthermore, such a medium may improve advertising response rates by providing a user with motivation to interact with an electronic ad.

SUMMARY

The present invention addresses the aforementioned needs by providing a system, method, and computer-readable storage medium for using electronic advertising resources as mechanisms to enable individuals to participate in electronic games with themselves or in conjunction with other players.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DESCRIPTION OF EMBODIMENTS

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

The present invention is described herein mainly in terms of an individual accessing the Internet, such as via a personal computer (e.g., a desktop computer, a laptop computer, a tablet computer), a mobile phone, a multipurpose mobile device (e.g., a smartphone, a personal electronic assistant, an iPod, etc.). This is not to be construed as limiting as the present invention may be applicable to any electronic network accessible to a user via a network-appropriate device. For example, the present invention may be applied to broadcast networks (e.g., cable, satellite, etc.), mobile networks, interactive television systems, kiosk systems, and any technologies that enable the electronic distribution of content.

Advertisement Game Network (AGN)

Figure 1:
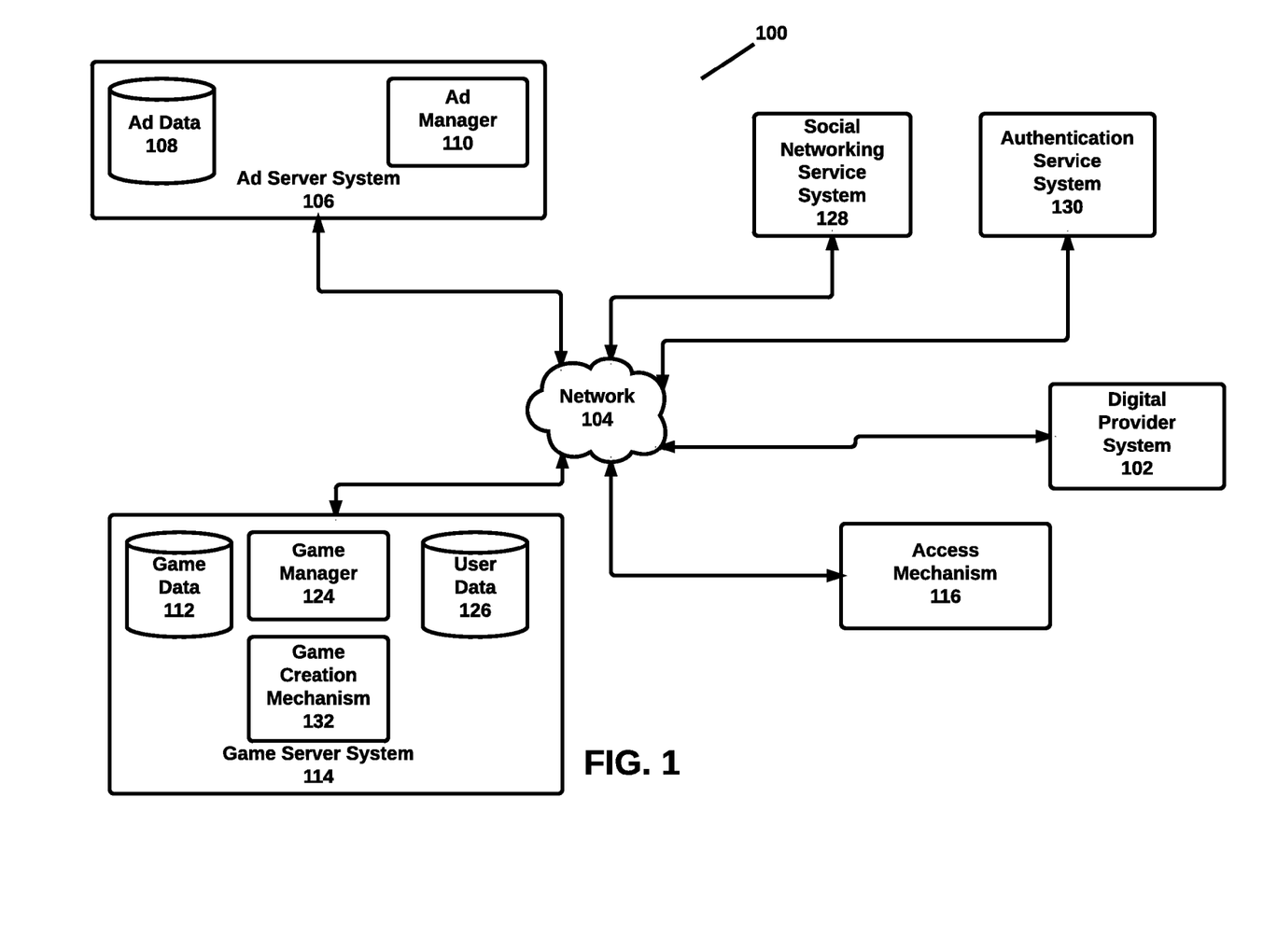
FIG. 1 illustrates a general architecture overview of an embodiment of an advertisement game network.

As illustrated by FIG. 1, the present invention pertains to advertisement game network (AGN) 100. Although only a single instance of each component is depicted, this is for illustrative purposes only and is not to be construed as limiting. Furthermore, although each component is depicted and described herein as separate, this is not to be construed as limiting, and components may be combined per implementation. For example, ad server system 106 and game server system 114 may be combined into one component and/or be maintained by the same entity or affiliated entities. For example, AGN 100 may interact with several, disparate ad server systems 106, such as servers run by Google, Yahoo, Microsoft, and AOL. The components of the system may interact with one another via network 104, which may be an applicable electronic network, such as the Internet or a mobile network.

Access mechanism 116 be a device that may access network 104. For example, access mechanism 116 may be a personal computer (e.g., a desktop computer, a laptop computer, a tablet computer), a mobile phone, a multipurpose mobile device (e.g., a smartphone, a personal electronic assistant, an iPod, etc.), a television, a kiosk, an electronic sign or digital billboard, etc. Access mechanism 116 may include software, hardware, or a combination thereof configured to enable the viewing and the inputting of information by the user. For example, access mechanism 116 may include a web browser, such as Microsoft Internet Explorer or Mozilla Firefox, or a mobile app, such as a specialized app or browsing app. AGN 100 may be accessible via various embodiments of access mechanism 110, such as those specific to particular types of devices, and a user may employ any combination of these devices. For example, a user may begin participating in an ad game via a mobile phone and later continue via a television. In one scenario, a software application may ease use of AGS 116. A web browser "add-on," a Web service, a mobile app, installed software, etc. may enable functionality that eases authentication and game play. The software application may enable cloud-based computing. For example, the software application may synchronize with data stored in a user account. The software application may store a user's credentials and preference information, thereby enabling automatic user authentication and seamless interaction with game server system 114. For example, the software application may provide user credentials to game server system 114, authentication service system 130, or social networking service system 128.

Ad server system 106 may be maintained by an ad entity, which may be an organization or individual that distributes electronic ads. An ad entity may be an ad provider (e.g., Google AdSense), an advertising agency, an individual advertiser, a newspaper (e.g., with classified ads), etc. Ad server system 106 may maintain ad data 108, which may include any data relevant to an electronic ad, such as electronic advertising content. Ad manager 110 may enable the transmission and retrieval of data within ad server system 106 and may also enable ad server system 106 to interact with external mechanisms. The term "electronic ad" is not to be construed as limiting and may pertain to electronic data associated with an advertisement in various forms as would be appropriate to the related system component. For example, in relation to a server or a Web service, an electronic ad may pertain to a data record and/or computer code. In relation to access mechanism 110, an electronic ad may pertain to a visual representation of an advertisement along with other data, such as a link. An electronic ad may include a video, an image, textual data, and/or any other advertising medium. An electronic ad may include data indicative of a particular item for sale, such as an item offered at eBay.com, Amazon.com, etc.

Game server system 114 may enable an individual to participate in an ad game via network 104. Game server system 114 may store game data 112 necessary for game play. For example, game data 112 may include graphical data, such as Flash files, image files, game code, etc. Game server system 114 may store user data 126. User data 126 may include user account information, including a user's status in a particular game, a history of a user's play, user identification data (including a user identifier, as described below), access mechanism identifiers, etc. Game manager 124 may manage the transmission and retrieval of data within game server system 114 and may also enable game server system 114 to interact with external mechanisms. Additionally, game server system 114 may include a game creation mechanism 132 to enable game designers to create games to be played via game server system 114. Game creation mechanism 132 may produce an AGN code that may be included in an application, such as a Web page, to enable the application for game play, as described in further detail below. The term "application" as used hereon may include any electronic medium capable of displaying electronic data, such as an electronic ad or game element. For example, an application may be a Web page, a video game, a mobile app, a digital sign, an electronic billboard, etc. Although the present invention is described primarily herein in terms of the distribution of game elements via an ad space included in a Web page, this is not to be construed as limiting. It is to be understood that the concepts described herein may be applicable to any mechanisms or mediums involving the distribution of electronic content.

Digital provider system 102 may maintain any data necessary for the display of an application. In one example embodiment, digital provider system 102 may be a publisher Web server system maintaining any data necessary for the display of a Web page. In another example embodiment, digital provider system 102 may be a mobile app server system maintaining any data necessary for display and use of a mobile app. For example, as a user browses the Internet via access mechanism 116, access mechanism 116 may interact with digital provider system 102 to obtain Web content to display to the user. Digital provider system 102 may be maintained by a digital provider, which may be any entity that employs electronic channels (e.g., Web sites, electronic games, mobile apps, etc). to distribute content. For example, a digital provider may be a newspaper, a blogger, a retailer, an ad entity, a Web publisher, a mobile app service provider, etc. Social networking service system 128 may include a server configured to enable social networking, such as Facebook, Twitter, Google+, MySpace, etc. Social networking service system 128 may be considered a particular embodiment of digital provider system 102 and any instance of "digital provider system 102" may be also be considered applicable to "social networking service system 128."

Authentication service system 130 may be a service employed by one or more of the mechanisms of AGN 100 to enable the authentication of a user. Authentication service system 130 may authenticate users on behalf of game server system 114, rather than game server system 114 itself. As mentioned, game server system 114 may interact with social networking service system 128. Social networking service system 114 may handle user authentication instead of, or in addition to, game server system 114 or authentication service system 130. In one embodiment, game server system 114 interfaces with Facebook, Google, and/or other similar services, such that for the majority of users for the majority of the time, no prompting of user credentials is necessary when the user is already logged into one of those other services using access mechanism 116. For example, authentication service system 130 may enable a user to login to an account maintained by game server system 114 or digital provider system 102. In some scenarios, authentication service system 130 may be incorporated in other system mechanisms. For example, authentication service system 130 may include a service such as oAuth and OpenID.

AGN Code

An AGN code may be a computer code, such as JavaScript code, HTML (including HTML5), or similar medium, that causes communication of an instruction to retrieve game-element data. The AGN code may cause communication of the instruction directly to game server system 114 or may cause the game server to be accessed by way of an ad server. The AGN code optionally also enables a user to participate in an ad game via access mechanism 116. When an application (e.g., Web page) is enabled with an AGN code, the AGN code may direct digital provider system 102 to interact with game server system 114 (either directly or via ad server system 106) to retrieve and distribute one or more game elements to the user, thereby enabling ad game play. To participate in AGN 100, a digital provider, such as a Web publisher, may embed an AGN code within a designated area of an application, such as an ad space. For example, a Web publisher may place an AGN code in an ad space. The digital provider may embed the AGN code with an ad code received from an ad entity. On its own, the ad code may direct digital provider system 102 to retrieve an electronic ad from ad server system 106 for distribution to a user via access mechanism 116. In one scenario, an ad entity may provide the digital provider with an ad code that already includes an AGN code. In an alternate embodiment, a digital provider may include an AGN code in an application independent of an ad code. For example, a Web publisher may include an AGN code in an ad space by itself rather than include the AGN code with an ad code. In one embodiment, an AGN code may interact with the associated application to determine its content and the game element retrieved and distributed may be associated with the application content. When included in an application, an AGN code may cause communication of an instruction to game server system 114, either directly or via ad server system 106, to retrieve game-element data for distribution at via the application. The instruction may include a user identifier identifying a user account.

User Data

User data 126 may include user accounts for each user. A user account may include various data associated with the user, such as contact information (e.g., name, email address, phone number, mailing address, etc.), a user's status in one or more games, a history of a user's game play, access mechanism identifiers, etc. The user account may also include user identification data, such as authentication credentials (e.g., login name and password), a user identifier, etc. A user identifier may be assigned to an individual upon user registration and may be used as a reference to the appropriate user account. The user identifier may be included in an identification token transmitted from game server system 114 to access mechanism 116. An identification token may be a tracking cookie or another identification medium and may be employed to identify the user, or access mechanism 116, as the user navigates the Internet. Access mechanism 116 may store the identification token and/or a user identifier, thereby enabling the user to be identified by AGN code-enabled applications.

Game server system 114 may include a social network mechanism, such as an application programming interface (API), that enables interaction with social networking service system 128, such as Facebook, Twitter, Google+, etc. One or more elements of relationship information and user data may be stored in association with a user's social network account in addition to, or instead of, being associated with a user account at game server system 114.

Electronic Ad Game Play via Game Server System

Figure 2:
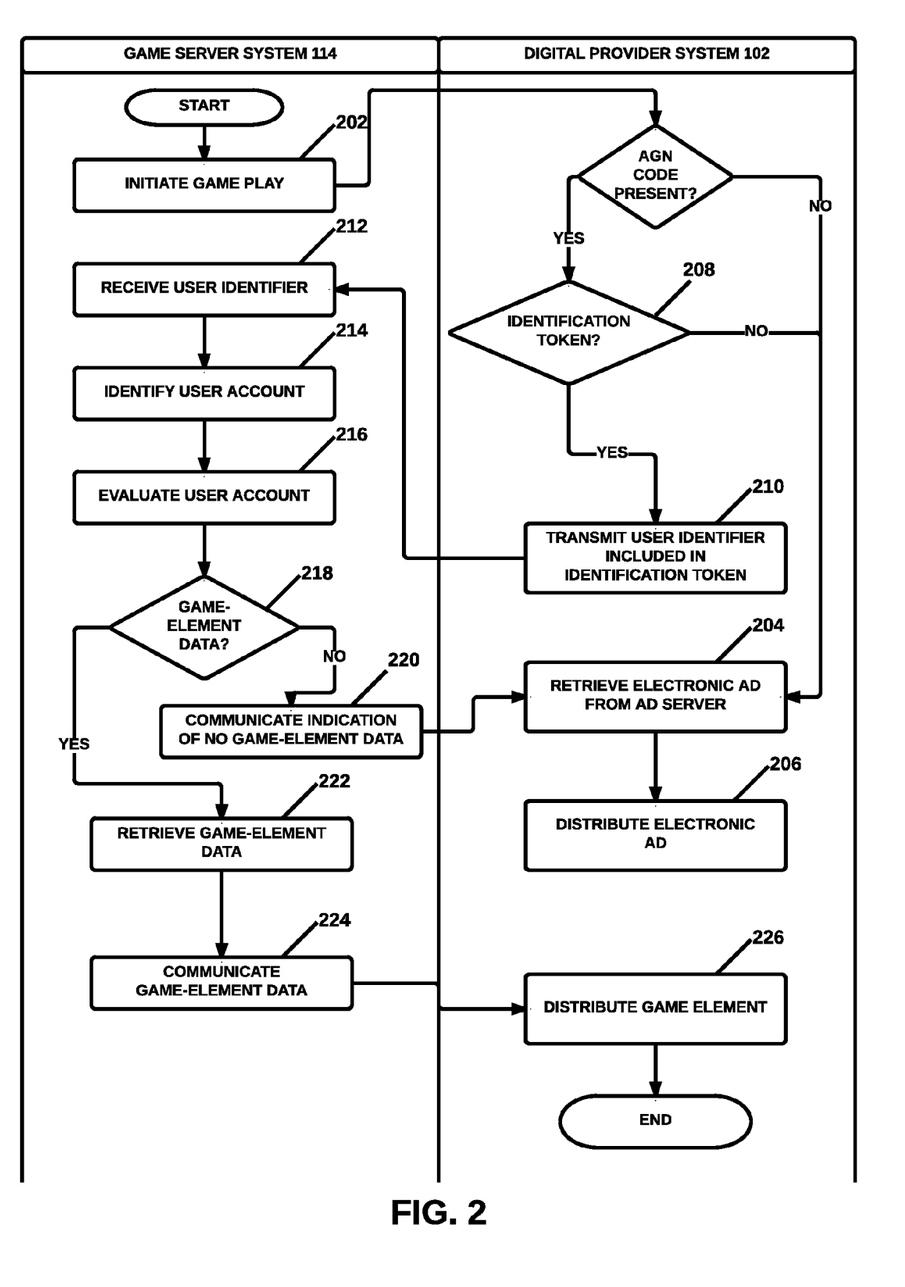
FIG. 2 illustrates a flowchart of an embodiment of a process for participating in an advertisement game via an advertisement game network.

FIG. 2 illustrates a flowchart of an embodiment of a process for participating in an ad game via AGN 100. Game server system 114 may initiate game play for a user (step 202) in various fashions. A user may initiate participation in a game manually by accessing a Web page, employing a browser add-on (e.g., a toolbar, a web browser extension, etc.), via a mobile app, or other means. The user may be required to provide authentication credentials. Authentication credentials may be maintained via access mechanism 116 and may be provided automatically on subsequent accesses. Once the user has been identified, game server system 114 may access or, if need be, generate, an identification token associated with the appropriate user account and transmit the identification token to access mechanism 116. If access mechanism 116 already has stored an identification token, it need not be retransmitted. In one scenario, as long as access mechanism 116 maintains a stored user identification token, the user need not reenter authentication credentials and may automatically participate in an ad game. Alternatively, a user may be required to provide authentication credentials (either manually or by selecting to transmit stored credentials) to activate a stored identification token.

As a user interacts via access mechanism 116 with an application provided via digital provider system 102, the user may be presented with one or more ad spaces. If an AGN code is not present in an ad space, digital provider system 102 may communicate an instruction to ad server system 106 to retrieve an electronic ad (step 204) and distribute it via the ad space (step 206). An ad space identifier may be communicated that indicates an appropriate format for the electronic ad, such as the appropriate dimensions, colors, text size, etc. If the ad space has been enabled with an AGN code, the digital provider system 102 may determine if access mechanism 116 has an identification token indicating that the user is participating in an ad game (step 208). If access mechanism 116 does not have such an identification token, digital provider system 102 may retrieve an electronic ad from ad server system 106 (step 204) and distribute it via the ad space (step 206). If an identification token has been stored, digital provider system 102, via the AGN code, may communicate an instruction to retrieve game-element data to game server system 114 and the instruction may include the user identifier included in the identification token (step 210). The instruction may include an ad space identifier that indicates an appropriate format for the game-element data, such as the appropriate dimensions, colors, text size, etc. The ad space identifier may be necessary to ensure that the retrieved game-element data can be displayed properly within the application. Game server system 114 may receive the user identifier (step 212) and employ it to identify an appropriate user account (step 214). Game server system 114 may evaluate the user account in regard to which games (if any) the user is participating in, the user's status in a game, etc. (step 216). Game server system 114 may determine if there is appropriate game-element data to be served based upon this evaluation (step 218).

For example, a user may be participating in a blackjack game and game server system 114 may determine how many virtual cards have been distributed to the user. Game-element data may be determined at random, either within the confines of a particular game a user is playing or at random in general. In the aforementioned blackjack game example, the game may be designed to distribute a random card corresponding to one of the fifty-two cards included in a standard deck of playing cards, accounting for previously distributed cards. Alternatively, the game element distributed may be completely random. For example, game server system 114 may enable users to participate in ten games and may randomly select a game element from any of these ten games to distribute to the user.

If there is no appropriate game element to be served, game server system 114 may communicate an indication of this to digital provider system 102 (step 220), which may retrieve an electronic ad from ad server system 106 (step 204) and distribute it via in the ad space (step 206). If there is appropriate game-element data, game server system 114 may retrieve any data necessary to distribute the game element, such as graphical elements (e.g., a flash file, image files, etc.) (step 222) and communicate the game-element data to the digital provider system 102 (step 224). Game-element data may be retrieved from game server system 114 itself (e.g., game data 112) or from an external source indicated by the game's designer upon game creation. For example, one or more elements of game data may be retrieved from ad server system 106 or another external storage location. Per the received game-element data, digital provider system 102 may distribute a game element to the user in the AGN-enabled ad space (step 226).

The game element distributed enables a user to participate in a game. Although it need not, a game element may include one or more piece of electronic advertising content. For example, a game element may be sponsored by an ad entity and may include associated advertising. Although the game element may contain advertising content, it may also involve enjoyable game play, and therefore may entice the user to direct his attention to it, rather than the core content of the application. This may provide the associated ad entity with greater results than a typical electronic ad. A complete game may be sponsored by an ad entity and may be part of an advertising campaign. Participating in and/or completing a game may enable a user to receive a discount coupon, a free sample, or another incentive. Games may be aimed at various demographic groups. For example, a game may be designed to appeal to book lovers and the object of the game may be to collect classic books for a virtual library. When the library is full, the user may receive an reward, such as a discount at Amazon or Barnes and Noble.

Electronic Ad Game Play via Ad Server System

In another embodiment, an AGN code may instruct digital provider system 102 to query ad server system 106, rather than game server system 114, regarding game participation. If access mechanism 116 has an identification token, digital provider system 102 may transmit a user identifier included with the identification token to ad server system 106. Ad server system 106 may maintain a registry of games it offers. If ad server system 106 determines that the received user identifier indicates the user is participating in a game, ad server system 106 may transmit the user identifier to game server system 114. Game server system 114 may attempt to identify the appropriate user record and proceed as previously described. Alternatively, as aforementioned, ad server system 106 and game server system 114 may be the same system (or may be components of the same system) and ad server system 106 may be equipped to function as gamer server system 114.

By relaying such data through ad sever 106, ad server system 106 may log which game elements have been viewed via at game server system 114 in addition to recording whether an electronic ad has been viewed. In one embodiment, game server system 114 is maintained by an ad entity and/or game server system 114 may be a component of ad server system 106.

Anonymous Game Play

In one embodiment, game server system 114 need not identify a user in order to enable game participation. This may enable a user whose access mechanism 116 does not have an identification token to play, such as a user who has not played before, has opted not to install an identification token, or has removed (e.g., purposely or accidentally deleted) the identification token. If an ad space has been enabled with an AGN code, digital provider system 102 may contact game server system 114 (either directly or via ad server system 106) regardless of whether access mechanism 116 has an identification token. If a user identifier has been obtained, game server system 114 may react accordingly. If a user identifier has not been obtained, game server system 114 may retrieve a non-specific game element and relay the non-specific game element to digital provider system 102 for distribution. For example, a non-specific game element may be a bonus reward applicable to multiple games, a playing card, a die roll, etc.

If the user responds to the distributed game element, game server system 114 may initiate an identification procedure, such as by prompting the user to create a user account, distributing an identification token to be stored by access mechanism 116, etc. In one embodiment, a user may be identified solely by an identification token, so there may be no need to store personal data in a user account. Once access mechanism 116 has an identification token, game server system 114 may identify the user by an anonymous user identifier. An anonymous user identifier may be a unique code or data element that identifies the user but is not be associated with any identifying information. Therefore, game server system 114 may recognize that user "452356" is playing a game, but there may be no further data indicating who user "452356" is, where he is located, etc. Game server system 114 may, for example, track an anonymous user identifier in order to monitor games played, game status, etc.

Social Gaming

Game participants may interact with one another via game server system 114 and/or an eternal service, such as social networking service system 128. Users may share virtual game pieces, request assistance from other players, help another player, share scores or game results, share rewards, etc. A player may be enabled to assist another player with a particular section of a game or obstacle within a game. For example, a game element may include a riddle or problem and a player may be enabled to request and receive help (i.e., via game server system 114 and/or social networking service system 128) from other users participating in the game via AGN 100. Alternatively, or additionally, a user may be enabled to prompt unknown users to provide assistance. For example, game server system 114 may communicate a post to social networking service system 128 encouraging other social network users to join the game (e.g., "Dave needs your help! Join in on the fun!").

Example Games

Traditionally, video games are restricted by the platform on which they are played. For example, video games played on game consoles, such as the Xbox 360, Nintendo DS, Nintendo Wii, and PlayStation3, require that the game console, or the game cartridge/disk, contain all the necessary game elements. Conversely, AGN 100 may employ the Internet as the game platform, enabling the game to be played across multiple virtual locations (e.g., Web pages), significantly broadening the gaming experience.

AGN 100 may enable games of various kinds An AGN game may involve a user collecting various game pieces, with the user winning when he has collected a sufficient amount or appropriate type of game pieces. As another example, an AGN game may simulate a board game and a retrieved game element may request a user roll virtual dice to determine how many places his game piece may move. An AGN game may be a puzzle or a challenge to solve, such as a virtual jigsaw puzzle or an interactive game level. As another example, a user may navigate from one Web page to the next attempting to collect food for a virtual pet. An AGN game may involve fantasy elements and a user may control a hero battling monsters in order to obtain treasure and magical weapons.

AGN 100 may enable games that require instant actions, that include interactive elements, etc. For example, AGN 100 may enable game play akin to Pac-Man, Tetris, a downhill skiing simulator, a car racing simulator, etc. Conversely, AGN 100 may enable games that are slower paced and that involve a user making calculated steps. For example, AGN 100 may enable game akin a virtual pet game, a board game, a role-playing game, a farming game, a card game, etc.

A game may be designed to direct the user from one Web page to another. For example, a game may be modeled after blackjack and when a user selects a game element distributed via an ad space, the game element may direct him to another Web page to receive his card. The process may repeat until the user finishes the game (e.g., "holds" his hand, hits twenty one, or exceeds twenty one). As another example, a user may move a virtual playing piece from one Web page to another, collecting items or solving problems as each new game element is distributed. As aforementioned, a game element may be distributed at random. For example, a game may involve a user collecting points, items, or other rewards as the user navigates the Web, and the amount and frequency that such items are distributed may be randomly determined.

It is to be understood that the aforementioned examples are provided for illustrative purposes solely and are not to be construed as limiting. Any type of game may be designed to be played via AGN 100.

Interacting with an Advertisement Storage System

In addition to interfacing with the components and entities previously described, AGN 100 may be configured to interact with an advertisement storage system, such as the one described in application Ser. No. 12/764,906, filed Apr. 21, 2010, entitled "System and Method for Improving E-Commerce." This application, and any application claiming priority to it, is incorporated by reference herein, in entirety, for all purposes. For example, game server system 114 may interact with the personal advertisement storage system server disclosed in the aforementioned application and thereby enable a user to store and share game elements. In one embodiment, the game server system 114 and the advertisement storage server may be components of the same system and may be managed by the same service provider.

According to example embodiments of the present invention, components of AGN 100, including digital provider system 102, ad server system 106, game server system 114, access mechanism 116, social networking service system 128, and authentication service system 130, may be implemented by various means. Means for implementing the systems, mechanisms and modules may include hardware, alone or under direction of one or more computer program code instructions, program instructions or executable computer-readable program code instructions from a computer-readable storage medium.

In one example, one or more apparatuses may be provided that are configured to function as or otherwise implement the systems, mechanisms and modules shown and described herein. Generally, an apparatus of exemplary embodiments of the present invention may comprise, include or be embodied in one or more fixed or portable computing devices, a number of examples of which are provided above. The apparatus may include one or more of each of a number of components such as, for example, a processor connected to memory.

The processor is generally any piece of hardware that is capable of processing information such as, for example, data, computer-readable program code, instructions, etc. (generally "computer programs," e.g., software, firmware, etc.), and/or other suitable electronic information. More particularly, for example, the processor may be configured to execute computer programs, which may be stored onboard the processor or otherwise stored in the memory. The processor may be a number of processors, a multi-processor core or some other type of processor, depending on the particular implementation. In another example, the processor may be embodied as or otherwise include one or more application-specific integrated circuits (ASICs), field-programmable gate arrays (FPGAs), etc. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information. The memory may include volatile memory and/or non-volatile memory, and may be fixed or removable. Examples of suitable memory include random access memory (RAM), read-only memory (ROM), a hard drive, a flash memory, a thumb drive, an optical disk, a magnetic tape or some combination of the above. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface and/or one or more user interfaces. The communications interface may be configured to transmit and/or receive information, such as to and/or from other apparatus(es), network(s), etc. The communications interface may be configured to transmit and/or receive information by physical (wireline) and/or wireless communications links.

The user interfaces may include a display and/or one or more user input interfaces. The display may be configured to present or otherwise display information to a user, suitable examples of which include a liquid crystal display (LCD), light-emitting diode display (LED), plasma display panel (PDP), etc. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), etc. The user interfaces may further include one or more interfaces for communicating with peripherals such as printers, scanners, etc.

As indicated above, program code instructions may be stored in memory, and executed by a processor, to implement functions of the systems, mechanisms and modules described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Execution of the program code instructions may produce a computer-implemented process such that the instructions executed by the computer, processor or other programmable apparatus provide operations for implementing functions described herein. Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

The invention claimed is:

1. A game server comprising a processor and a memory storing executable instructions that, in response to execution by the processor, cause the game server to at least:
   receive, at the processor, an instruction from a Web page server to retrieve a Web page game element for distribution into an ad space included in a Web page, the ad space being configured to include a computer code that communicates to the processor the instruction to retrieve the Web page game element, the instruction including a user identifier identifying a user account associated with a user and including an ad space identifier that indicates an appropriate format for the Web page game element based upon the ad space included in the Web page;

identify, by the processor, the user account stored in the memory and associated with the user via the user identifier;

determine, by the processor, if the memory stores an appropriate Web page game element for the user account to be distributed to the ad space included in the Web page; and if the memory stores an appropriate Web page game element for the user account to be distributed to the ad space included in the Web page, cause by the processor communication of the appropriate Web page game element for display into the ad space; and if the memory does not store an appropriate Web page game element for the user account to be distributed to the ad space included in the Web page, cause by the processor communication of an indication to the Web page server to retrieve an electronic ad from an ad server to display into in the ad space.

2. The game server of claim 1, wherein the processor being caused to determine the appropriate Web page game element for the user account comprises the processor being caused to determine the appropriate Web page game element based upon the content of the user account.

3. The game server of claim 1, wherein the processor being caused to determine the appropriate Web page game element for the user account comprises the processor being caused to determine the appropriate Web page game element at random.

4. The game server of claim 1, wherein the memory stores further executable instructions that, in response to execution by the processor, cause the processor to retrieve the appropriate Web page game element from a source external to the game server.

5. The game server of claim 4, wherein the source external to the game server is an ad server.

6. The game server of claim 1, wherein the processor being caused to receive the instruction to retrieve the Web page game element comprises the processor being caused to receive the instruction via an ad server and the processor being caused to cause communication of the appropriate Web page game element comprises the processor being caused to cause communication of the appropriate Web page game element via the ad server.

7. A method to distribute a game element, the method comprising:

receiving, by a processor of a game server, the game server comprising the processor and a memory, an instruction from a Web page server to retrieve a Web page game element for distribution into an ad space included in a Web page, the ad space being configured to include a computer code that communicates to the processor the instruction to retrieve the Web page game element, the instruction including a user identifier identifying a user account associated with a user and including an ad space identifier that indicates an appropriate format for the Web page game element based upon the ad space included in the Web page;

identifying, by the processor, the user account stored in the memory and associated with the user via the user identifier;

determining, by the processor, if the memory stores an appropriate Web page game element for the user account to be distributed to the ad space included in the Web page; and if the memory stores an appropriate Web page game element for the user account to be distributed to the ad space included in the Web page, causing by the processor communication of the appropriate Web page game element for display into the ad space, and if the memory does not store an appropriate Web page game element for the user account to be distributed to the ad space included in the Web page, causing by the processor communication of an indication to the Web page server to retrieve an electronic ad from an ad server to display into in the ad space;

wherein receiving the instruction, identifying the user account, evaluating the user account, causing communication of the appropriate Web page game element, and causing communication of the indication are operations performed by the game server including the processor and the memory storing executable instructions that when executed by the processor cause the game server to perform the respective operations.

8. The method of claim 7, wherein determining the appropriate Web page game element for the user account comprises the processor determining the appropriate Web page game element based upon the content of the user account.

9. The method of claim 7, wherein determining the appropriate Web page game element for the user account comprises the processor determining the appropriate Web page game element at random.

10. The method of claim 7, further comprising the processor retrieving the appropriate Web page game element from a source external to the game server.

11. The method of claim 10, wherein the source external to the game server is an ad server.

12. The method of claim 7, wherein receiving the instruction to retrieve the Web page game element comprises the processor receiving the instruction via an ad server and causing by the processor communication of the appropriate Web page game element comprises causing by the processor communication of the appropriate Web page game element via the ad server.

13. A computer-readable storage medium having computer-readable program code portions stored therein that, in response to execution by a processor of a game server, cause the processor to at least:

receive an instruction from a Web page server to retrieve a Web page game element for distribution into an ad space included in a Web page, the ad space being configured to include a computer code that communicates to the processor the instruction to retrieve the Web page game element, the instruction including a user identifier identifying a user account associated with a user and including an ad space identifier that indicates an appropriate format for the Web page game element based upon the ad space included in the Web page;

identify the user account stored in a memory of the game server and associated with the user via the user identifier;

determine if the memory stores an appropriate Web page game element for the user account to be distributed to the ad space included in the Web page; and if the memory stores an appropriate Web page game element for the user account to be distributed to the ad space included in the Web page, cause communication of the appropriate Web page game element for display into the ad space; and if the memory does not store an appropriate Web page game element for the user account to be distributed to the ad space included in the Web page, cause communication of an indication to the Web page server to retrieve an electronic ad from ad server to display into in the ad space.

14. The computer-readable storage medium of claim 13, wherein the processor being caused to determine the appropriate Web page game element for the user account comprises the processor being caused to determine the appropriate Web page game element based upon the content of the user account.

15. The computer-readable storage medium of claim 13, wherein the processor being caused to determine the appropriate Web page game element for the user account comprises the processor being caused to determine the appropriate Web page game element at random.

16. The computer-readable storage medium of claim 13 having further computer-readable program code portions stored therein that, in response to execution by the processor, cause the processor to retrieve the appropriate Web page game element from a source external to the game server.

17. The computer-readable storage medium of claim 16, wherein the source external to the game server is an ad server.

18. The computer-readable storage medium of claim 13, wherein the processor being caused to receive the instruction to retrieve the Web page game element comprises the processor being caused to receive the instruction via an ad server and the processor being caused to cause communication of the appropriate Web page game element comprises the processor being caused to cause communication of the appropriate Web page game element via the ad server.

* * * * *